Sept. 14, 1965    S. A. KNIGHT    3,206,751
ELECTRONIC LOCATION AND GUIDANCE SYSTEM
Filed Oct. 6, 1959    5 Sheets-Sheet 1

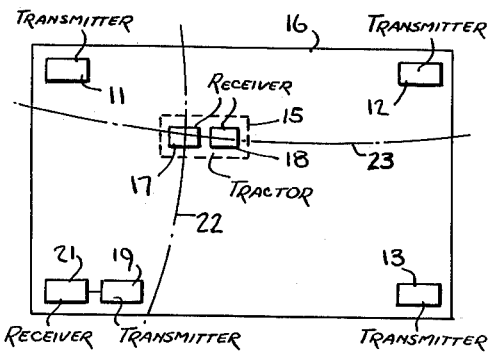

Fig. 1.

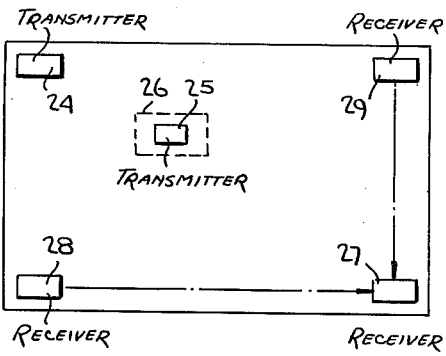

Fig. 2.

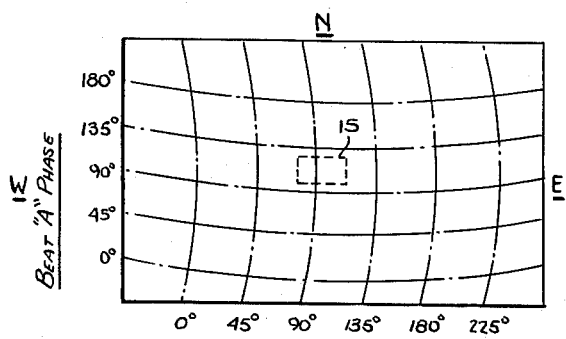

Fig. 3.

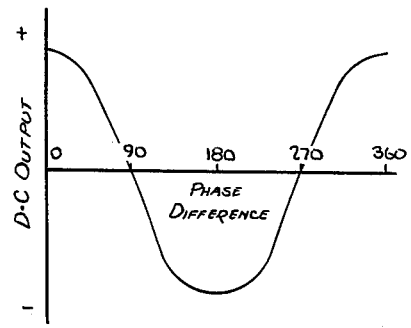

Fig. 6.

| | DIRECTION OF MOVEMENT OF OBJECT | | | |
|---|---|---|---|---|
| | NORTHERLY | EASTERLY | SOUTHERLY | WESTERLY |
| DIRECTION QUADRANT | NW TO NE | NE TO SE | SE TO SW | SW TO NW |
| BEAT WITH MAX. RATE OF CHANGE OF DIRECTION | A+ | B+ | A- | B- |
| FRONT-BACK SELECTION & HI PHASE | A FRONT | B FRONT | A BACK | B BACK |
| LEFT-RIGHT SELECTION & HIGHER PHASE | B, RT. | A, LT. | B, LT | A, RT. |

Fig. 4.

INVENTOR.
SHELDON KNIGHT
BY Kenyon & Kenyon
ATTORNEYS

INVENTOR.
SHELDON KNIGHT
BY Kenyon & Kenyon
ATTORNEYS

INVENTOR.
SHELDON KNIGHT
BY Kenyon & Kenyon
ATTORNEYS

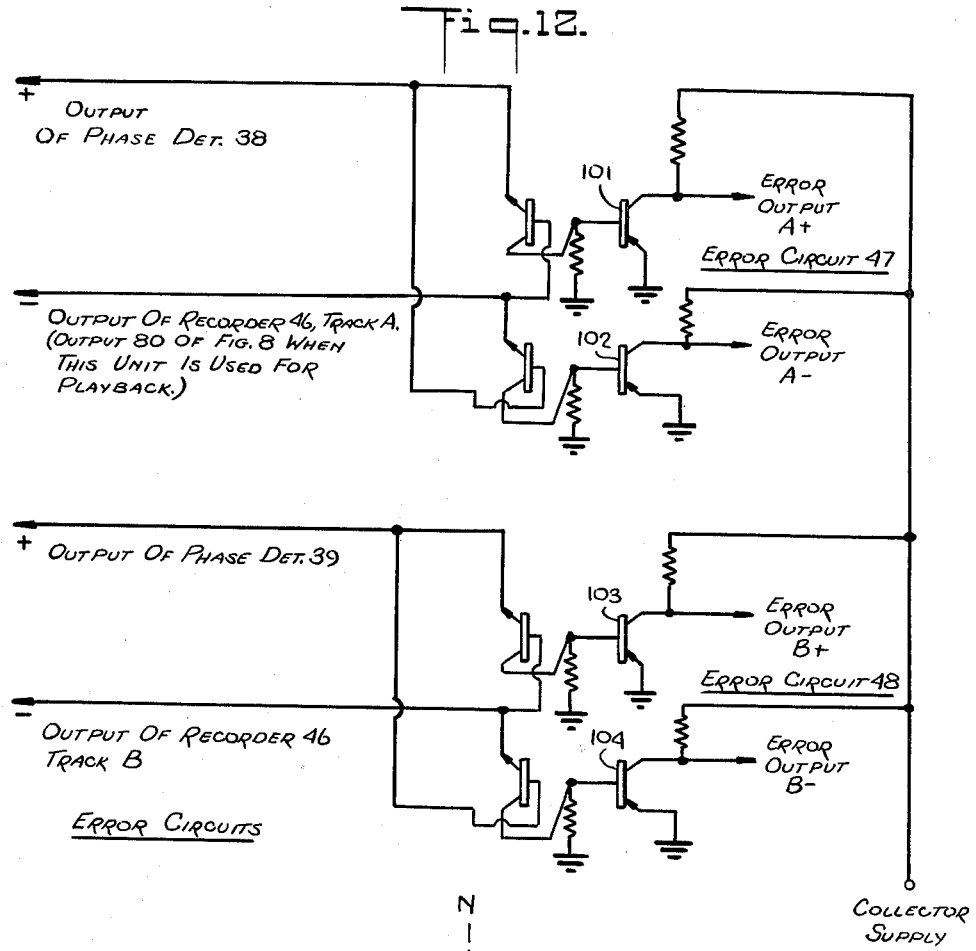
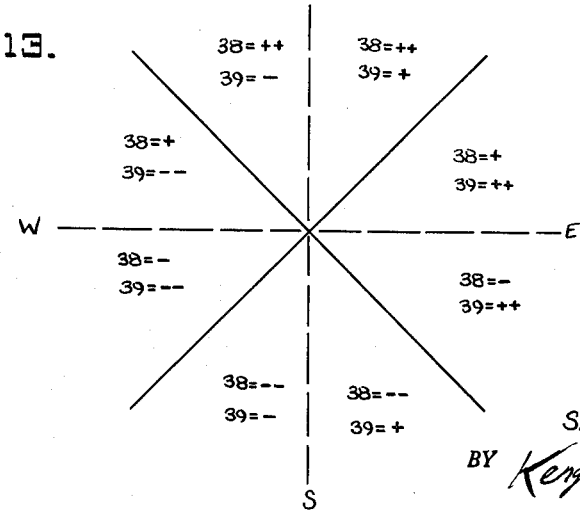

United States Patent Office

3,206,751
Patented Sept. 14, 1965

3,206,751
ELECTRONIC LOCATION AND GUIDANCE SYSTEM
Sheldon Ashley Knight, Hughson, Calif., assignor of forty percent to David Q. Reed, Kansas City, Mo.
Filed Oct. 6, 1959, Ser. No. 844,723
3 Claims. (Cl. 343—105)

The present invention relates generally to electronic location and guidance systems and more particularly to continuous wave radio techniques and apparatus for determining the position of an object and for guiding the movement of an object so located.

Navigational aids are known whose operation is based on the propagation time difference of synchronized pulsed or continuous wave transmissions. One such system is the so-called "Loran" in which a position fix is obtained from the intersection of two loci of position, each locus of position being determined by measuring the propagation time difference between two synchronized pulsed signal emissions from two known but widely spaced radio transmitting sources.

Since the velocity of propagation of radio waves over the earth's surface is essentially constant, the propagation-time-difference varies directly as the distance difference between a receiving station and two fixed transmitters. Therefore, the locus of points which are a given constant time difference from two fixed points is a hyperbola with the fixed points as foci. Thus the two transmitting stations or fixed points provide a family of hyperbolas about the stations, each curve representing a constant value of propagation-time-difference.

Position-fixing methods which make use of a family of hyperbolas may be classed as hyperbolic systems, and in addition to Loran and Gee, this class also encompasses the Dingley, Decca and Poppi systems. Dingley uses hyperbolas derived from constant propagation frequency differences, whereas the Decca and Poppi systems utilize hyperbolas taken from a constant propagation phase difference identical in principle to optical interference phenomena.

Existing guidance systems which make use of the above-described position-fixing principles are relatively elaborate in design and entail expensive and complicated apparatus. These factors render existing systems commercially unfeasible for location and guidance applications with respect to such devices as farm tractors, industrial utility vehicles and small boats.

Accordingly, it is the principal object of the present invention to provide an improved electronic system for locating the position of an object within a given area and for supplying the resultant positional information to a memory and servo system so as to guide the object through a desired path.

More specifically, it is an object of the present invention to utilize the phase characteristics of the heterodyne beats developed between spaced sources of continuous waves to establish hyperbolic lines of position over a working area, and by using the beats instead of the waves themselves to effect a significant simplification in the apparatus for position sensing.

Also an object of the invention is to utilize the rate and direction of the change in phase of these heterodyne beats as the object moves through the working area to select the proper beat for lateral guidance as well as the proper beat for longitudinal guidance, and also to furnish sensing information from which the object can determine if a correction should be made to its right or left, or whether its speed should be increased or decreased without regard to the direction in which the object is traversing the field.

A still further object of the invention is to introduce the resultant positional and sensing information into a memory unit and servo system so as to cause the object to follow a designated path.

A salient feature of the invention resides in the fact that it makes possible the guidance of an object over a desired path with a degree of accuracy and sustained stability not theretofore obtainable. While the simplification of equipment makes the invention particularly suitable for farm tractors and the like, it is also useful for aircraft and missile guidance and for the automatic navigation of large vessels and submarines.

In one preferred form of the invention, two wave generators, such as radio transmitters, are spaced apart at predetermined locations within a given area. Each of the transmitters operates on a distinct frequency and preferably, in order to conserve the band width of the overall system, the frequencies of the transmitters in a particular system are closely adjacent to one another. A receiver in a movable object or vehicle receives the transmitted signals from the two transmitters and generates a beat frequency wave by heterodyning the signal from one of the transmitters against that from the other.

The beat frequency wave thus generated has a frequency determined by the difference between the frequencies of the two transmitted waves and a phase determined by the difference between the phases of the transmitted waves at the point of reception. The phase of each of the transmitted waves in turn is dependent upon the instantaneous phase of the wave at the two transmitters and the distance of the point of reception from each of the transmitters, in accordance with the well known laws of wave propagation.

In itself, the beat frequency wave produced at the movable receiver is insufficient to locate the position of the receiver with respect to the positions of the known transmitters. To supply the necessary additional information, another receiver at a fixed, predetermined location also receives the signals from the two transmitters and develops a second beat frequency signal by beating the two incoming signals together. This second beat frequency signal will of course have the same frequency as the signal generated in the movable receiver but will differ from the signal in the movable receiver only by a difference in phase.

Since the fixed receiver is at a known location, the phase of the second beat frequency wave is dependent only on the initial phases of the waves transmitted from the transmitters. This second beat frequency wave generated at the fixed receiver is then transmitted in such a way as to produce no significant further phase shift with distance, by an additional transmitter to a second receiver located on the movable object or vehicle and the two beat frequency signals are thus available within the movable vehicle.

These beat frequency waves are then measured against each other to determine the phase of the first beat frequency wave with respect to he phase of the second beat frequency wave as received at the fixed receiving station. In this way the variable unknown phase due to the initial phases of the waves transmitted by the transmitters is cancelled out and the measurement of the phase of the beat frequency waves determines the location of the movable receiver on a hyperbolic line of position within the field of transmission of the two transmitters.

The hyperbolic lines of position constitute a family of hyperbolae with the two transmitters as the foci. In order to determine the point of the movable receiver along the particular hyperbolic line, an additional pair of transmitters and receivers may be used, with the additional pair of transmitters located at different locations from the first pair. It is in fact unnecessary to provide more than one additional transmitter since the second pair can be made up of this additional transmitter and one of the original transmitters. By generating an additional pair of beat frequencies signals in the movable receiver and in the stationary receiver and by comparing the phases of beat frequency signals, the precise location of the movable receiver can be determined in two dimensions.

Information produced as to the location of the movable receiver within the field of operation may be applied to control circuits to guide the vehicle on which the movable receiver is mounted so as to cause the vehicle to follow a predetermined path or a guided path over this field.

The use of heterodyne beats rather than the radio frequency signals themselves which display similar phase characteristics gives rise to a number of practical advantages.

If the fields are to be accurate and reproducable, there must be no phase displacement in the carriers other than that produced by distance. This means that high frequencies must be used if the presence of the earth is not to seriously alter their phase. High frequency operation also minimizes interference from other radio services. On the other hand, phase is difficult to measure in the high-frequency range and it becomes difficult to avoid undesired phase shifts in processing the signals.

By the heterodyne technique, in accordance with the invention, most signal processing is in the audio frequency range and the above noted problems are not presented. Since most of the processing takes place in the audio range, transistors can be successfully used in lieu of vacuum tubes, with an accompanying economy in space, power consumption and reliability. Moreover, as the envelope of the radio signals carries the information, for short range work the signals may be detected directly with a simple crystal detector, thus further obviating high frequency handling.

For a better understanding of the invention, as well as other objects and features thereof, reference is had to the following detailed description to be read in conjunction with the accompanying drawings, wherein:

FIG. 1 shows a plan view of a location system according to the invention.

FIG. 2 shows an alternative arrangement to FIG. 1.

FIG. 3 shows a section of the field of operation of the system of FIG. 1.

FIG. 4 is a tabulation of variables encountered in traversing the section in FIG. 3.

FIG. 6 is a response curve of a conventional phase detector.

Figure 10:
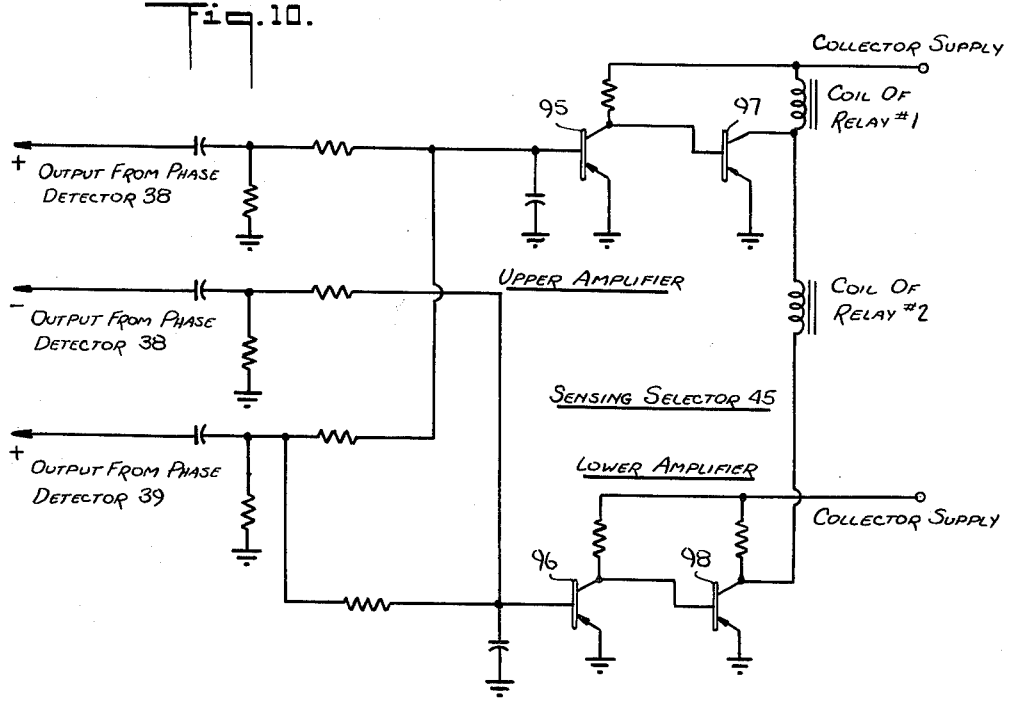

FIG. 10 schematically illustrates the circuit of the sensing selector.

Figure 11:
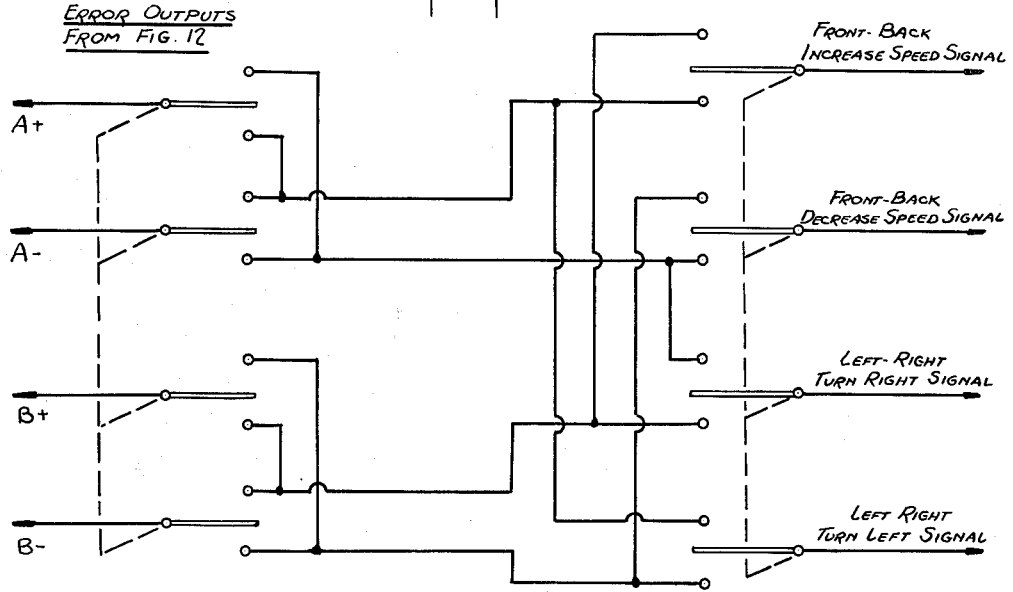

FIG. 11 shows the circuit of the sensing relays.

FIG. 12 is the circuit of the error or difference circuit.

FIG. 13 is a graph illustrative of the operation of the system.

In FIG. 1, three transmitters 11, 12 and 13 are located at fixed, predetermined points within a rectangular area, generally indicated by the reference character 16. In practice, these transmitters may operate in the radio frequency range or they may operate as audio wave generators of sound or supersonic waves in air or water. The frequencies of the waves generated by the transmitters are slightly different from one another, the difference between the frequencies being preferably comparatively very small.

For example, transmitter 11 might generate a radio frequency wave of 27.253 megacycles; transmitter 12 might generate a wave of 27.255 megacycles and transmitter 13 might generate a wave of 27.260 megacycles. With these frequencies, beats of 2, 5 and 7 kilocycles can be derived by heterodyning the frequencies of transmitters 11 and 12, 12 and 13, and 11 and 13, respectively. These frequencies are of course only illustrative and can be varied at will.

A movable device 15 which might, for example, be a tractor or an airplane or any other vehicle, is located within the field 16. Two receivers 17 and 18 are mounted on the vehicle 15. Receiver 17 is tuned broadly enough to receive signals from all three of the transmitters 11–13 and receiver 18 is tuned to a frequency sufficiently different from the frequencies of the transmitters 11–13 as to be non-interfering herewith. This latter receiver is tuned to a frequency of a transmitter 19 which transmits signals produced within a receiver 21.

In the operation of the system in FIG. 1, the signals emitted by transmitters 11–12 beat together within the receiver 17 to produce a first beat frequency signal. It is a characteristic of the heterodyne beat between two continuous waves that the phase of the beat frequency signal is equal to the difference in the phases of the two waves producing it. Since the transmitter 11 operates on a frequency of 27.253 megacycles and transmitter 12 on a frequency of 27.255 megacycles the beat frequency signal produced in receiver 17 has a frequency of 2 kilocycles.

At some instant in time the signals from the two transmitters 11 and 12 will, in effect, be in phase with each other at the location of the receiver 17, but at succeeding instants of time the more rapidly varying signal from transmitter 12 will cause the two signals to become apparently increasingly out of phase. Subsequently the two signals will return to an equal phase condition and then to an out-of-phase condition. This variation between in-phase and out-of-phase operation takes place at the beat frequency of 2,000 times per second. This beat frequency signal passes through its zero phase when the two signals from the transmitters 11 and 12 are effectively in phase.

The phase of the continuous wave from transmitter 11 received at a particular location of the receiver 17 is equal to an unknown phase constant plus a phase shift introduced by the time required for the wave to travel from the transmitter 11 to the receiver 17. Since this wave propagation takes place at a constant velocity, the phase shift is proportional to the distance from the transmitter 11 to the receiver 17. Correspondingly, the signal produced by transmitter 12 undergoes a phase shift proportional to the distance from the latter transmitter to the receiver 17.

In the standard physical terminology, the propagation of radio waves takes place at the speed of light which is usually indicated by the letter $c$. If the frequency of the transmitted wave is F cycles per second, the phase shift of the wave in proceeding from the transmitter to the receiver is equal to $$360° \times \frac{DF}{c}$$

where D is the distance from the transmitter to the receiver. While this equation establishes the phase shift caused by the distance of travel of the waves, the precise phase of the waves is still indeterminate because of the fact that the phase of the two signals at the transmitters 11 and 12 is indeterminate.

In order to get rid of the indeterminate effect of the initial phase of the waves, the receiver 21 is provided at a fixed point to pick up signals from both the transmitters 11 and 12 and to derive a beat frequency signal therefrom. This beat frequency signal will have the same two-kilocycle frequency as the beat frequency signal produced within the receiver 17 but may or may not have the same phase as the signal at the receiver 17, depending on the relative locations of the latter receiver and receiver 21.

By locating receiver 21 at a predetermined fixed location with respect to the transmitters 11 and 12, the phase shift encountered in the waves traveling from the two transmitters to receiver 21 can be computed. Thus, the only unknown factor left in determining the precise phase of the wave of the beat frequency signal at the receiver 21 is due to the unknown initial phases of the waves emitted by transmitters 11 and 12.

The beat freqency signal produced within the receiver 21 by beating the signal from transmitter 11 against the signal from transmitter 12 is modulated onto the carrier of an additional transmitter 19 which operates at a frequency considerably different from the frequencies of the transmitters 11–13 so as not to interfere therewith. This non-interfering signal containing information as to the phase of the beat frequency signal produced in the receiver 21 is then transmitted to the receiver 18 on the vehicle 15. Receiver 18 detects the signal from transmitter 19 and thus produces a replica of the second beat frequency signal at the receiver 21.

By this means there are present in the receivers 17 and 18 two beat frequency signals. One of these generated within the receiver 17 has a phase which has two unknowns in it, one of these unknowns being due to the location of the receiver 17 and the other being due to the initial phases of the waves transmitted by transmitters 11 and 12. The other beat frequency signal, which is a replica of the signal produced at the receiver 21, has only one unknown factor in it and that is due to the initial phases of the waves generated at the transmitters 11 and 12. By comparing these two beat frequency signals against each other, the factor due to the initial unknown phase of the waves generated at transmitters 11 and 12 is cancelled out and the only thing affecting the difference between the phases of the beat frequency signals in the vehicle 15 is the factor due to the location of the vehicle within the field 16.

What is thus established is that the distance from the transmitter 11 to the receiver 17, minus the distance from the transmitter 12 to the receiver 17, is a constant. As is mathematically well known, this places the receiver 17 on a hyperbolic line of position 22 having the transmitters 11 and 12 as a foci. In fact, the entire field 16 is divided by similar hyperbolic lines of position having the two transmitters 11 and 12 as foci. But for purposes of clarity, only one such line 22 is shown in the drawing.

In exactly the same way, receiver 17 may be determined to be on a second hyperbolic line of position 23 governed by the placement of the transmitters 12 and 13. All that is required to obtain this second hyperbolic line is that the receivers 17 and 21 have a sufficiently broad band of reception to receive signals from all three of the transmitters 11–13 and that the transmitter 19 has provisions for transmitting a signal with two sets of information on it, these sets of information including information as to the phase of the beat frequency signal from the transmitted signals of transmitters 11 and 12 and a second beat frequency signal produced from the transmitted signals from transmitters 12 and 13. If the transmitters are located roughly in the corners of a rectangular area, the two hyperbolas will intersect at approximately right angles and thereby pinpoint the position of the object within the rectangle.

The system illustrated in FIG. 1 shows the basic arrangement underlying the invention but many variations are possible as long as sufficient transmitter pairs and receivers are provided to establish two hyperbolic lines of position which intersect at approximately 90° so as to satisfy the accuracy requirements of the system.

Referring now to FIG. 2, there is shown one variation comprising only two transmitters 24 and 25, transmitter 24 being fixed in the field and transmitter 25 being placed on the moving object 26. Provided at three fixed positions in the field are receivers 27, 28 and 29. Receiver 27 picks up the signal from the transmitters 24 and 25 to produce the first beat. Receiver 27 is also linked by wire or radio to receivers 28 and 29 which pick up the signal from the respective transmitters to produce in receiver 27 a second beat, the same frequency as the first beat but displaced in phase relative thereto. By comparing the phase of the two beats, two lines of position are established as in the case of FIG. 1.

If the system is to be used for guidance as well as a location device, means must be provided to determine which of the two beats would be suitable for lateral guidance and which of the two would be more suitable for speed control and longitudinal guidance. In addition, once the proper beat is selected, means must be provided for determining if the lines of higher phase shift are to be the right of the movable object or to its left, or front or back whereby a correction in the proper direction can be effected. The manner in which this is accomplished will be explained hereinafter.

Referring now to FIG. 3, there is shown an enlargement of a section of the field 16, the curved lines in the horizontal direction representing changes of phase (0° to 180°) in beat frequency "A" and the curved lines in the vertical direction representing changes of phase (0° to 225°) in beat frequency "B." For purpose of orientation, the directions are labeled North, South, East and West.

As the object shifts position through the field and hence across the lines of constant phase, the phase of each of the two beats will be continually changing. The beat with the highest rate of change wil be the proper one to use for front to back control and since it is desirable from the standpoint of maximum sensitivity that a given physical movement represent the maximum possible phase shift, once the front-back beat is selected, the other beat is of course automatically the proper one for left-right guidance.

Referring to FIG. 4, there is illustrated a table derived from the movement of a vehicle with the field section shown in FIG. 3. At the head of the table there is listed the four quadrants of direction in which the object may be moving, namely, NW to NE, NE to SE, SE to SW and SW to NW. A column is provided for each quadrant. The first horizontal row below the head of the table shows which of beats A and B will have the greatest rate of change as the object is in movement, and whether the phase of the beat is increasing (+) or decreasing (−).

The next horizontal row indicates the proper beat selected for front-back guidance, and whether high phase is ahead or behind. The third rows show the proper selection for left-right and whether the higher phase is to the right or left.

From the foregoing it can be seen that the only information required completely to specify the selection of the beats and their sense is: (a) which of the beats exhibits the greatest change in phase as the object moves along and (b) whether the change in phase is increasing or decreasing.

Figure 5:
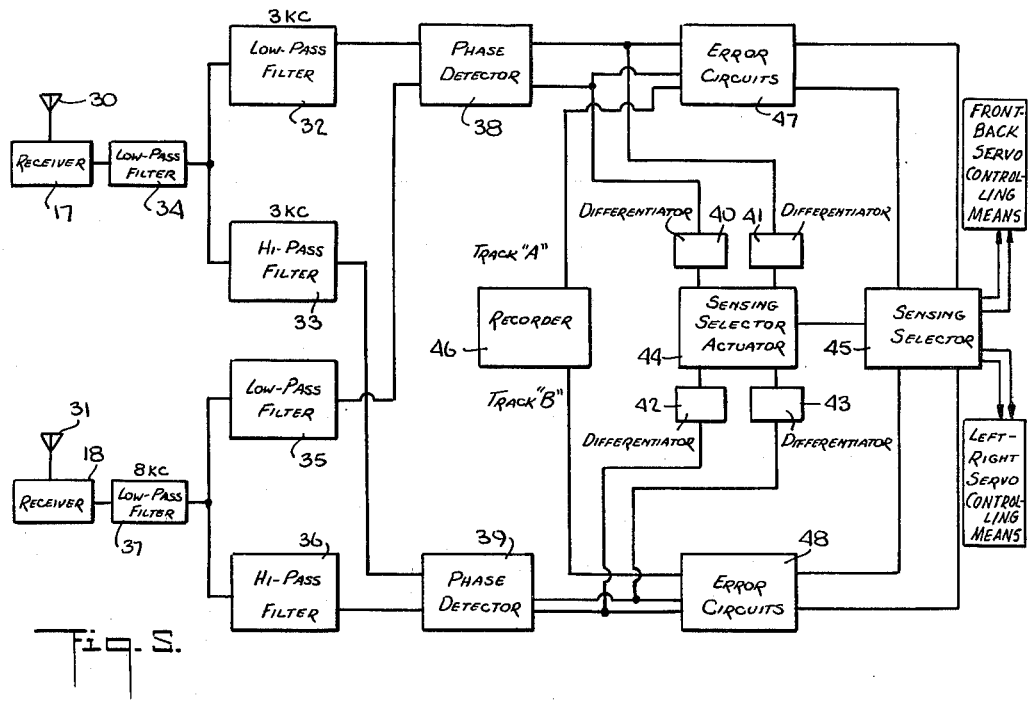
FIG. 5 is a block diagram of the receiving system in the vehicle shown in FIG. 1.

FIG. 5 shows in block form a receiving system for carrying out the principles underlying the invention. Receiver 17 placed in the moving vehicle is connected to an antenna 30 for intercepting signals from transmitters 11, 12 and 13 (FIG. 1). Receiver 18, also placed in the vehicle, is connected to an antenna 31 to intercept the signal from transmitter 19, which transmitter conveys the beats produced in the fixed receiver 21 in the fiield.

Low-pass and high-pass filters 32 and 33 separate the two desired beats from the three which appear in the output of receiver 17, the two filters being supplied through a common low-pass filter 34 coupled to the receiver output. Similarly low-pass and high-pass filters 35 and 36 are coupled to the output of receiver 18 through common filter 37 to derive the two desired beat frequencies.

Filters 32 and 35 select one beat and filters 33 and 36 select another, the filters being designed to minimize the introduction of any phase shift greater than the error margin of the system. The outputs of filters 32 and 35 are compared in a phase detector 38 to develop two output signals of opposite polarity but equal magnitude, the output signals being proportional to the phase difference of the signals from filters 32 and 35.

In a like manner, applied to a phase detector 39 are the beats from high-pass filters 33 and 36 to produce two outputs proportional to the phase difference between the inputs.

The two outputs from phase detector 38 are fed through differentiators 40 and 41 to develop control signals which are proportional to the time rate of change of the phase detector outputs to which they are connected. Correspondingly, the two outputs from phase detector 39 are fed through differentiators 42 and 43 to develop control signals proportional to the time rate of change of the phase detector outputs. The control signals from the four differentiators are applied through an actuator circuit 44 to a sensing selector 45 which routes the appropriate phase detector output and polarity to the front-back and right-left channels so that the higher phase is always ahead and to the right. The internal switching of the sensing selector 45 is determined in accordance with the table in FIG. 4.

An important feature of the system resides in its ability to record the signals received as the object is manually guided over the desired path and to use the record so made for automaticaly reproducing the path. This realistic procedure produces a higher degree of accuracy than artificially generating a pre-calculated signal, since any disturbance in the field will be automatically recorded and hence compensated for in the playback.

For recording a path, the output of phase detector 38 is recorded in one channel of an electrical recorder and the output of the phase detector 39 is recorded simultaneously in a second channel. The recorder may be a magnetic tape recorder, recording being carried out as the vehicle is manually guided over the desired route.

For playback and automatic guidance, the outputs from the two recorded channels of the recorder 46 are applied to differential or error circuits 47 and 48, respectively, to which is also applied the outputs of the phase detectors 38 and 39. Thus the error circuits compare the recorded signals with those produced during actual travel of the vehicle, the difference signal being applied to the sensing selector 45 to effect a correction in a direction and to a degree causing the vehicle to traverse the same path which was initially recorded under manual guidance. To accomplish this result, the sensing selector 45 is coupled to front-back and left-right servo systems whose operations are governed by the error circuits.

Phase detectors 38 and 39, along with recorder 46, present some special problems. These phase detectors must produce a direct-current output which is accurately proportional to, or at least a constant function of the phase difference between the two beat signals applied to it, and which is independent of their strength or frequency over reasonable limits. Moreover, direct currents are difficult to accurately record on electrical recorders, hence it would be desirable for the phase detector to furnish an alternating current indication of phase more suitable for recording. Another requirement is that the D.C. output versus phase characteristic of the detector should be unambiguous; that is, a given D.C. output voltage should represent only one phase difference. Conventional phase detectors have a characteristic such as is shown in FIG. 6, with the same value of output for two input phase differences very close together in the neighborhood of zero and 180°.

Figure 7:
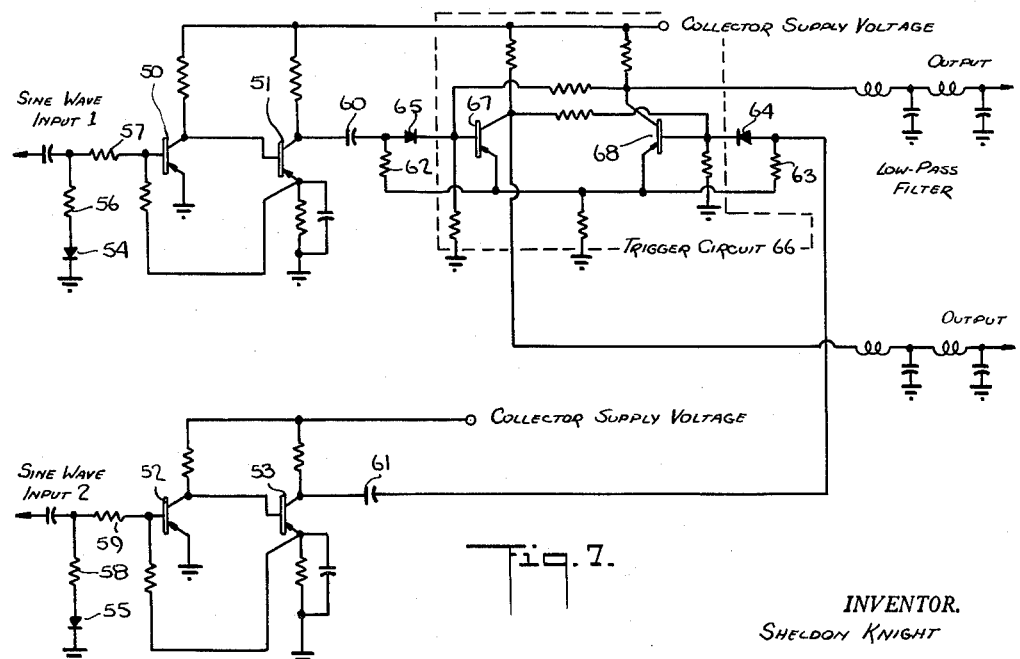
FIG. 7 is the schematic diagram of a phase detector in accordance with the invention.

FIG. 7 shows a simplified diagram of a phase detector meeting these requirements. Transistors 50, 51, 52 and 53 form a clipping amplifier whose function is to produce a square wave output from the sine wave inputs. If the gain in the stages is sufficiently high, and the input signal is at a sufficiently high level, the output will be a constant square wave regardless of the input level over a wide range. Diodes 54 and 55 along with resistors 56, 57, 58 and 59 and the emitter-to-base diode of transistors 50 and 52 maintain equal loading for both halves of the sine wave and thus assure symmetrical clipping.

The square wave output from transistors 51 and 53 is differentiated by condensers 60 and 61 along with resistors 62 and 63, passed through diodes 64 and 65 to select only the positive differentiated pulses, and is applied to trigger circuit 66. By applying the pulses derived from transistor 51 to one side of the trigger and those from transistor 53 to the other, it is assured that transistor 67 of the trigger circuit 66 will be driven out of conduction by the differentiated leading edge of the square wave output of transistor 51, and transistor 68 will cease to conduct upon arrival of the differentiated leading edge of the square wave from transistor 53. The result is that transistor 67 conducts only during the time interval between the leading edge of the square wave from transistor 53 and that of transistor 51. Transistor 68 will conduct the rest of the time.

If the collector voltage of transistors 67 and 68 is passed through a low-pass filter to remove the fluctuations and furnish an output equal to the average voltage on the collectors, these two D.C. outputs will be proportional to the phase difference between the two sine waves being fed originally into transistors 50 and 52. As this phase difference moves through 360°, the D.C. output from transistor 67 will increase from a low value up to almost the collector supply voltage, and that from transistor 68 will decrease from almost the collector supply voltage down to a low value which depends upon circuit constants. These are the two positive and negative going D.C. outputs referred to in connection with FIG. 5.

The minimum frequency allowable for the three beats depends upon the carrier stability of the three oscillators of transmitters 11, 12 and 13 (FIG. 1) in the field producing the beats. With ordinary design it appears that 2 kc. is the lower safe limit for transmitters operating in the 30 mc. region. This means that the two beats selected for guidance will be in the range of 2 to 5 kc. or so. But if the phase detector described in connection with FIG. 7 is used and the alternating positive and negative pulses recorded directly, difficulty may be experienced in maintaining high frequency response in the recorder sufficient to sharply record the rapid rise at the beginning of the pulses, since the repetition rate of these pulses is of the order of 5 kc./sec.

Figure 8:
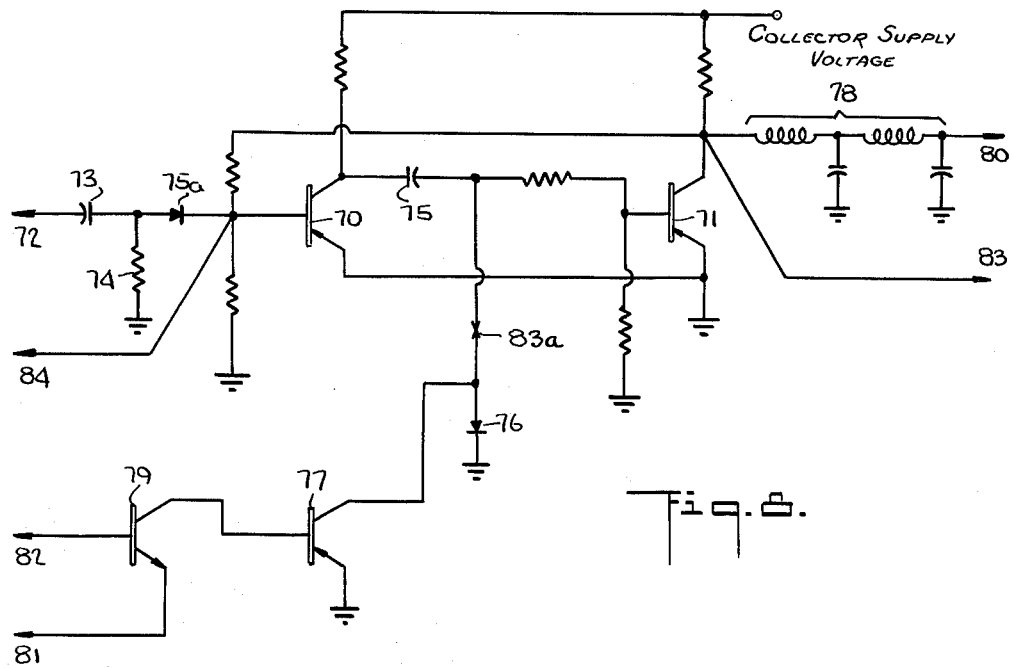
FIG. 8 is a pulse frequency-reducing circuit in accordance with the invention.

A preferred method of generating new alternating positive and negative pulses of a much lower repetition rate, while maintaining virtually the same relative spacing as the high frequency pulses from the phase detector is shown schematically in FIG. 8.

The operation of the pulse frequency-reducing circuit can best be understood by noting that transistors 70 and 71 together with their associated components form a monostable trigger circuit with transistor 70 normally in a state of conduction. If regular, low-frequency triggering pulses, say from a vibrator high-voltage power supply or a relaxation oscillator, are supplied at input 72, the arrival of the positive edge of each of these pulses through differentiating networks 73–74 and rectifier 75a will transfer conduction to transistor 71. Transistor 71 will remain in conduction only until condenser 75 discharges to the point where the current supplied to the base of transistor 71 is no longer sufficient to hold it conductive. At this time conduction will flip back to transistor 70 and remain in this state until the arrival of the next positive-going pulse at input 72. When conduction shifts back to transistor 70, condenser 75 is quickly recharged through the low forward impedance of diode 76 to prepare it for the next cycle.

The time required for condenser 75 to discharge depends upon the collector current which can flow through transistor 77. Clearly the more negative the base of transistor 77, the more collector current can flow and hence the faster will condenser 75 be discharged.

If the voltage from the collector of transistor 71 is passed through smoothing filter 78 designed so as to remove the A.C. signal components, passing only the average D.C. voltage appearing at the collector of transistor 7, its output will be the same fraction of the collector supply voltage as the fractional part of the time that transistor 71 is out of conduction.

Transistor 79 is a transistor of the opposite type to transistors 70, 71 and 77. For example, if transistors 70, 71 and 77 are PNP type, then transistor 79 is NPN. All the base current for transistor 77 must flow through the collector circuit of transistor 79, and as we have previously pointed out, this base current determines the conduction time of transistor 71.

The higher the base current of transistor 77, the shorter the conduction time for transistor 71 and hence the less negative D.C. output 80. If an external D.C. voltage, for example the D.C. output of the phase detector in FIG. 7, is applied to input 81 and output 80 is connected to input 82, the operation will be as follows:

The negative D.C. voltage applied to input 81 will be passed through transistor 79 to the base of transistor 77, thereby increasing its collector current and decreasing the relative time transistor 71 remains in conduction following a positive triggering pulse to input 72. This will make output 80 and also input 82 to which it is connected more negative. The process will continue until input 82 is only very slightly less negative than input 81, at which time the conduction through transistor 79 will be reduced, due to the low forward bias on the emitter to base diode, to the point just sufficient to maintain this state. In other words, output 80 is forced to be almost the same as the negative D.C. input voltage applied to input 81. This is done by varying the relative conduction time of transistors 70 and 71.

If the D.C. applied to input 81 is the D.C. output of transistor 67 in FIG. 7, for example, the relative conduction time of transistor 71 will be forced to be almost equal to that of transistor 67, but the repetition rate of conduction shifts can be any frequency desired, depending only upon the frequency of the triggering input to input 72. Condenser 75 must also be adjusted as this frequency is changed to insure it always being large enough to keep transistor 71 in conduction during the full time between triggering pulses with minimum collector current flowing in transistor 77.

Output 83, coming directly from transistor 71, can be recorded directly to provide the alternating positive and negative pulses of the same relative spacing as those from the collector of transistor 67 in FIG. 8, but of a much lower repetition rate. The same circuit can be used on playback of the information to generate the D.C. voltages for use in the difference circuits 47 and 48 (FIG. 5). If the connection at point 83a is opened, and condenser 75 shorted, the circuit reverts to an ordinary bistable trigger.

Applying the reproduced alternating positive and negative pulses through input 84 to transistor 70 will cause the conduction shifts on playback to follow those during recording, and output 80 along with a similar filter connected to the collector of transistor 70 will provide the positive and negative going outputs required of the recorder in FIG. 5.

The recording pulse generator produces an asymmetrical square wave of the same relative spacing as the conduction shifts, but at a much lower frequency than the phase detector output. An advantage of this type of recording is that being independent of the frequency of the asymmetrical square wave and hence of the tape recorder speed, the recorder speed can be varied in response to front-back guidance signals rather than the speed of the guided vehicles. This can be of distinct advantage in the case of tractors, for example, where an area of compacted earth may slow the tractor down so much that even under full throttle is cannot go fast enough to keep up with the tape which was recorded when the earth say was wet and soft.

Figure 9:
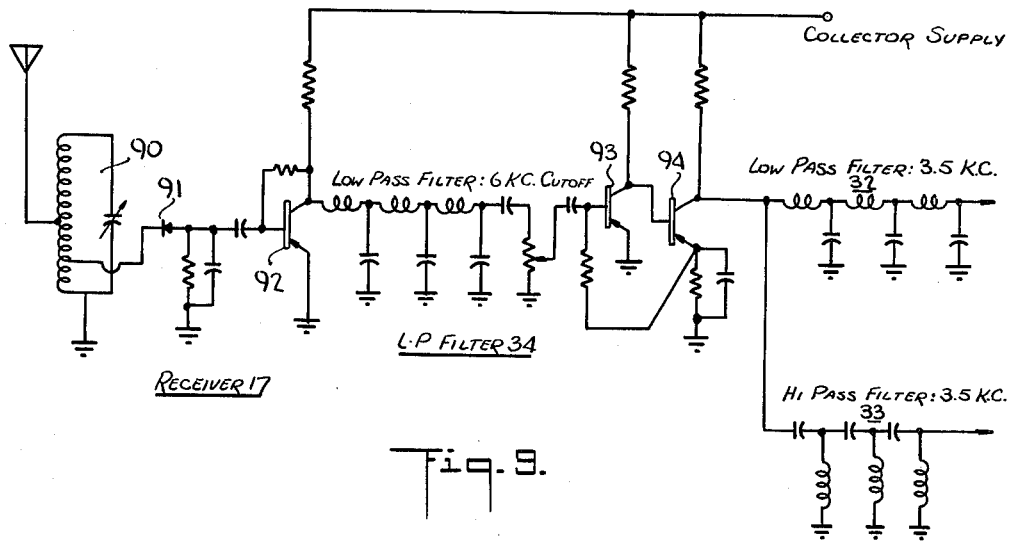
FIG. 9 is a schematic diagram of one of the receivers in the system.

In FIG. 9, there is shown the schematic diagram of one of the two receivers 17 and 18 (FIG. 1) in conjunction with the filters for deriving the two beats therefrom. Receiver 17 including a resonant circuit 90 tuned broadly to the incoming signals from the transmitters, the signals being detected in mixer diode 91 and fed through a transistor amplifier stage 92 through the low-pass filter 34 having, in practice, a 6 kc. cut-off, thereby passing only the 3 and 5 kc. beats. The low-pass filter 32 has a 3.5 kc. cut-off and is coupled to the output of the filter 32 to pass only the 3 kc. beat, whereas the high-pass filter which cut off frequencies below 3.5 kc. passes only the 5 kc. beat. An amplifier composed of two transistor stages 93 and 94 is interposed between the common 6 kc. filter 34 and the low and high pass filters 32 and 33.

The sensing selector 45 (FIG. 5) is shown schemmatically in FIG. 10, the contact wiring therefor being shown in FIG. 11. The selector is provided with relays #1 and #2. Relay #2 is arranged to close when the derivative of the signal from phase detector 38 exceeds that of phase detector 39, thus selecting this output for front-back guidance. Relay 1 is arranged to close when whichever signal is selected for front-back guidance has a positive derivative. In other words, relay #2 effectively selects the letter in the top row of the table in FIG. 4 and relay #1 selects the sign appended to the latter.

FIG. 13 shows the four quadrants corresponding to the four columns of the table in FIG. 4. As the tractor moves in these four directions, the derivatives of the outputs of phase detectors 38 and 39 are indicated by plus and minus signs. A double sign indicates that the magnitude of that derivative exceeds the magnitude of the other derivative.

It will be noted, referring again to FIG. 10, that the transistor 95 in the upper amplifier receives the algebraic sum of the derivatives of the two-phase detectors 38 and 39, and will be rendered conductive only when the total pluses exceed the minuses in FIG. 13, or otherwise stated, when the tractor is headed in the North or East direction.

The transistor amplifier 96 in the lower amplifier responsive to the algebraic difference between the derivatives and accordingly will be rendered conductive only as the tractor moves East and South. It will be seen that relay #2 is connected between the collectors of the output transistors 97 and 98 of the upper and lower amplifiers, respectively, and will therefore be energized only when one amplifier is conductive and the other is not. Referring to FIG. 13, this means that relay #2 closes only when the tractor is heading North or South and these are the directions in which the output of phase detector 38 should be used for front-back guidance and detector 39 for left-right guidance.

Relay #1 closes only when the sign of the proper front-back guidance derivative is positive, as can be seen in FIG. 13.

The error circuits 47 and 48 are shown in FIG. 12. It will be seen that error circuit 47 compares the output of phase detector 38 with one track (A) of recorder 46 to produce error outputs A+ and A− in the top and bottom transistor sections. When the unit is used for playback, applied to the error circuit is the output 80 in FIG. 8.

Error circuit 48 compares in the upper and lower transistor sections 103 and 104 the output of phase detector 39 with the second track (B) on the tape of recorder 46 to produce error outputs B+ and B−.

The connections of relays #1 and #2 are shown in FIG. 11 and it will be seen that the error outputs A+, A−, B+ and B− from the error circuits 47 and 48 (FIG. 12) are applied to the movable ganged armatures of the relay #1, the fixed double-throw contacts of this relay being so connected to the fixed double-throw contacts of relay #2 such as to effect connections with the ganged armatures therein to provide front-back and left-right control of the servo system operatively coupled thereon.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In a vehicle guidance system in which a plurality of signals are received at the vehicle and the characteristics of the received signals are indicative of the position of said vehicle, first means for converting said signals into second signals dependent upon the time rate of change of said characteristics, guiding means for guiding said vehicle and having a plurality of control channels, and second means connected to said first means controlled by the second signal corresponding to the characteristic having the greatest time rate of change and by the direction of change thereof for supplying control signals having a predetermined relation to said characteristics to predetermined ones of said channels.

2. A sensing system comprising first means for measuring the time rate of change of a pair of signals, second means for measuring the direction of change of the one of said signals corresponding to the characteristic having the greater time rate of change, a plurality of output channels, and selecting means connected to said first and second means and controlled by the rate of change of said signals and the direction of change of said one signal and connected to said output channels for supplying signals to said channels.

3. A system as set forth in claim 2 wherein said selecting means supplies said one signal to one of said channels and the other of said signals to another of said channels.

References Cited by the Examiner

UNITED STATES PATENTS

| 2,148,267 | 2/39 | Honore | 343—105 |
| 2,472,129 | 6/49 | Streeter | 343—105 X |
| 2,493,755 | 1/50 | Ferrill. | |
| 2,513,319 | 7/50 | Hawkins | 343—105 |
| 2,528,141 | 10/50 | Hastings | 343—105 |
| 2,616,079 | 10/52 | Timbie | 343—105 |
| 2,652,558 | 9/53 | Hawkins | 343—105 |
| 2,776,099 | 1/57 | Ferrill | 343—112 X |
| 2,991,011 | 7/61 | Schuck | 343—105 |

CHESTER L. JUSTUS, *Primary Examiner.*

FREDERICK M. STRADER, *Examiner.*